United States Patent [19]

Seto

[11] Patent Number: 4,639,649
[45] Date of Patent: Jan. 27, 1987

[54] MOTOR CONTROL DEVICE

[75] Inventor: Kaoru Seto, Chigasaki, Japan

[73] Assignee: Canon Kabushiki Kaisha, Tokyo, Japan

[21] Appl. No.: 838,394

[22] Filed: Mar. 6, 1986

Related U.S. Application Data

[63] Continuation of Ser. No. 563,793, Dec. 21, 1983, abandoned.

[30] Foreign Application Priority Data

Dec. 29, 1982 [JP] Japan ................................. 57-231516

[51] Int. Cl.[4] ............................................. H02P 5/16
[52] U.S. Cl. ..................................... 318/314; 318/326; 318/448
[58] Field of Search ............... 318/270, 314, 448, 449, 318/450, 463, 326

[56] References Cited

U.S. PATENT DOCUMENTS

| | | | |
|---|---|---|---|
| 3,621,353 | 11/1971 | Matley | 318/314 |
| 3,836,833 | 9/1974 | Harris et al. | 318/270 |
| 4,271,382 | 6/1981 | Maeda et al. | 318/314 X |
| 4,278,925 | 7/1981 | Minakuchi | 318/314 |

Primary Examiner—Benjamin Dobeck
Attorney, Agent, or Firm—Fitzpatrick, Cella, Harper & Scinto

[57] ABSTRACT

A motor control device comprises a motor speed detector, a reference signal generator and a control circuit for controlling rotation of a motor in accordance with a reference signal from the reference signal generator and a speed signal from the motor speed detector. The control circuit includes means for eliminating a phase error component during a phase synchronization pull-in period.

7 Claims, 13 Drawing Figures

FIG. 5(a)
PRIOR ART
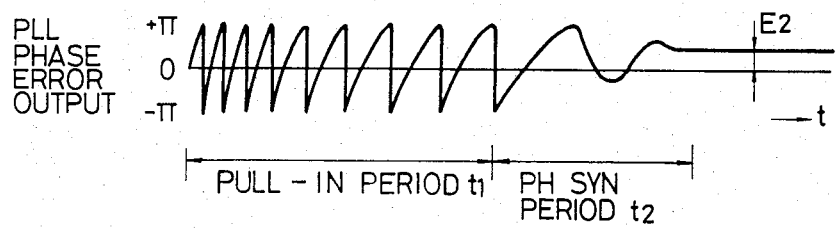
FIG. 5(b)
PRIOR ART
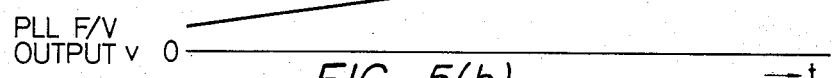
FIG. 5(c)
PRIOR ART
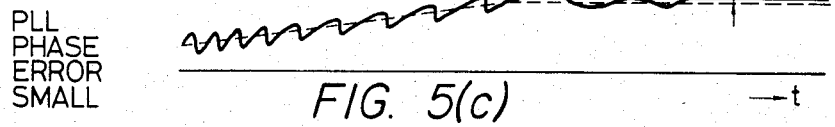
FIG. 5(d)
PRIOR ART
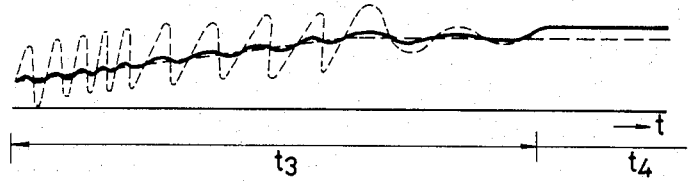
FIG. 5(e)

MOTOR CONTROL DEVICE

This application is a contiuation of application Ser. No. 563,793 filed Dec. 21, 1983, now abandoned.

BACKGROUND OF THE INVENTION

1. Field of the Invention

The present invention relates to a motor control device for controlling the rotation of the motor.

2. Description of the Prior Art

A method for phase-controlling rotation of a motor by a PLL (phase locked loop) has been known.

FIG. 1 shows a circuit configuration thereof. X denotes a crystal oscillator for generating a reference pulse signal $S_X$, M denotes a DC motor, and N denotes a rotating disc coaxially mounted to the motor M and having slits J rotated with the motor. The rotating disc cooperates with a photo-interrupter Q to generate a pulse signal $S_M$ at a period representing a rotating speed of the motor. Thus, the rotating disc N and the photo-interrupter Q form a photoencoder. A denotes a phase detector which detects a phase error of the motor rotation pulse signal $S_M$ from the reference pulse signal $S_X$ and supplies a phase error signal P to an adder K, and B denotes a frequency detector which converts the frequency of the motor rotation pulse signal $S_M$ supplied from the photo-interrupter Q to a voltage to supply a DC voltage V responsive to the frequency of the pulse signal $S_M$ to the adder K. A rotation error detector H which includes the phase detector A and the frequency detector B is commercially available as in integrated circuit and hence a detail thereof is not explained here. E denotes an operational amplifier, F denotes a power amplifier for driving the motor M, R1–R4 denote resistors, and C1 and C2 denote capacitors. A ratio R2/R1 represents a DC amplification factor of the operational amplifier, and a circuit Y comprising the resistor R3 and the capacitor C1 is a phase advance compensation circuit and a circuit W comprising the resistor R4 and the capacitor C2 is a phase retardation compensation circuit. Both circuits are inserted in many cases to stabilize the control system. When the control system is stable without the phase advance compensation or the phase retardation compensation, one or both of the compensation circuits may be omitted. The operation of the PLL control circuit of FIG. 1 is now briefly explained. In the PLL, when a frequency difference between the reference pulse signal $S_X$ and the motor rotation pulse signal $S_M$ is large, the phase detector A produces a beat signal corresponding to the frequency difference between both signals due to a non-linear operational characteristic of the phase detector A. If the beat frequency of the beat signal is lower than a specific frequency determined by a characteristic of a loop, the frequency difference between the motor rotation pulse signal $S_M$ and the reference pulse signal $S_X$ is reduced and the former is synchronized with the latter, but if the beat frequency is higher, a cycle slip is repeated and the frequency difference between those signals is not reduced and they are not synchronized.

FIG. 4 shows the phase error signal in the PLL phase synchronization period. S1 denotes a waveform of the beat signal and S2 denotesa DC component of the beat signal S1. If the rotation of the motor can respond to the frequency of the beat signal, the rotation speed of the motor is increased in a positive half-cycle to approach the frequency $f_M$ of the motor rotation pulse signal $S_M$ to the frequency $f_X$ of the reference pulse signal, and the rotation speed of the motor is decreased in a negative half-cycle to move the frequency of the motor rotation pulse signal $S_M$ away from the frequency of the reference pulse signal $S_X$. In the conventional PLL which uses a sawtooth wave shape comparison, the beat signal changes slowly in the positive half-cycle and changes rapidly in the negative half-cycle, due to a response characteristic of the motor. As a result, in one cycle of the beat signal, a mean DC level offsets positively as shown by S2 in FIG. 4, and the rotation speed of the motor is increased by the DC component S2 and the frequency $f_M$ of the motor rotation pulse signal $S_M$ approaches to the frequency $f_X$ of the reference pulse signal so that the frequency difference therebetween is reduced. Thus, the beat frequency is further lowered and a larger DC component is produced. In this manner, by a positive feedback effect, the frequency of the motor rotation pulse signal accelerately follows the frequency of the reference pulse signal. This process is called a frequency pull-in period, which is represented by t1 in FIG. 4. When the frequency difference of the signals reaches a frequency which is lower than a predetermined frequency $W_S$, the response of the rotation of the motor can perfectly follow the frequency of the beat signal and the synchronization is attained within the cycle. This process is called a phase synchronization period, which is represented by t2 in FIG. 4. The frequency difference range $W_S$ in which the frequency of the motor rotation pulse signal $S_M$ is synchronized with the frequency of the reference pulse signal $S_X$ within one or two cycles is called a lock-in range (corresponding to the phase synchronization period t2).

In the phase synchronization/pull-in period which includes the frequency pull-in period t1 and the phase synchronization period t2, as the frequency of the motor rotation pulse signal $S_M$ gradually rises, the frequency difference $\Delta W$ between the reference pulse signal $S_X$ and the motor rotation pulse signal $S_M$ decreases and the synchronization is attained. A frequency difference range $W_P$ in which the phase synchronization is attained is called a pull-in range (corresponding to t1+t2). A component E1 in FIG. 4 is a steady phase error produced in the PLL in the steady rotation. When the beat frequency rises, the DC voltage generated is lowered and a longer time is required for the frequency pull-in period t1. When the frequency difference $\Delta W$ of the motor rotation pulse signal $S_M$ relative to the reference pulse signal $S_X$ in the phase synchronized state, a frequency difference range $W_L$ in which the synchronization can be maintained is called a lock range. The lock range $W_L$, the pull-in range $W_P$ and the lock-in range $W_S$ usually meet a relation of $W_L > W_P > W_S$. Whatever wide the lock range $W_L$ is, the synchronization is hardly attained if the pull-in range $W_P$ is narrow. Accordingly, the pull-in range $W_P$ poses a design problem.

FIGS. 5(a)–5(d) show output waveforms in the circuit of FIG. 1 in the frequency pull-in period and the phase synchronization period, with the same time axis t.

FIG. 5(a) shows a waveform of the phase error signal P from the phase detector A, FIG. 5(b) shows a waveform (frequency component) of the DC voltage V representing the frequency of the pulse signal $S_M$ from the frequency detector B, FIG. 5(c) shows an output waveform of the operational amplifier E when a summation ratio of the phase error signal P to the DC voltage V is small, and FIG. 5(d) shows an output waveform of the operational amplifier when the summation ratio is large.

Components E2–E4 are steady phase errors generated in the steady rotation.

In FIG. 5(c), since the frequency component is sufficiently larger than the phase error component, the velocity control is dominant over the phase control. Thus, the pull-in range $W_P$ is wide and the phase synchronization is readily attained but an ability to compensate for the phase variation for a load variation in the steady rotation is lowered. As a result, the characteristic of the PLL cannot be fully utilized.

In FIG. 5(d), since the phase error component is large, the ability to compensate for the phase variation for the load variation in the steady rotation is enhanced but the phase synchronization pull-in by the frequency component is no readily attained, the pull-in range $W_P$ and the lock-in range $W_S$ are narrowed, and the phase synchronization pull-in is hardly attained or cannot be attained in certain cases.

As described above, in the PLL control, the phase synchronization pull-in characteristic and the phase variation compensation characteristic in the steady rotation are usually incompatible to each other, and when one characteristic is improved, the other characteristic is deteriorated. Thus, the only solution is to find out a compromise point for both characteristics during the design.

FIG. 2 shows a prior art circuit configuration which facilitates the phase synchronization with a large summation ratio of the phase error component. The like elements to those shown in FIG. 1 are designated by the like numerals and the explanation thereof is omitted. S denotes a frequency comparator which exactly detects the frequency $f_{MO}$ of the motor rotation pulse signal $S_M$ from the photointerrupter Q and compares it with the frequency $f_O$ of the motor rotation pulse signal $S_M$ at a target control rotating speed and the pull-in range $W_P$. When $f_{MO} < f_O - W_P$, that is, when the rotating speed of the motor M is too low to reach the pull-in range $W_P$, a 3-position relay T having terminals T1, T2 and T3 select the terminal T1 to disconnect the loop to effect an open control so that the motor rotating speed is increased. When $f_{MO} > f_O + W_P$, that is, when the motor rotating speed is so high that the frequency exceeds the pull-in range $W_P$, the relay T selects the terminal T3 to disconnect the PLL loop and effect the open control so that the motor rotating speed is decreased. When $f_O - W_P \leq f_{MO} \leq f_O + W_P$, the relay T selects the terminal T2 to form the PLL loop and effect a closed control so that the PLL control is effected. As described above, since the frequency $f_{MO}$ of the motor rotation pulse signal $S_M$ is within the pull-in range $W_P$, the phase synchronization pull-in is attained. In this manner, the frequency $f_{MO}$ of the motor rotation pulse signal $S_M$ is detected by the frequency comparator S and the control loop is opened or closed depending on the detected frequency.

However, the configuration of FIG. 2 has the following disadvantage. In many cases, the pull-in range $W_P$ is a very narrow range which is less than 0.5% of the frequency $f_O$ of the motor rotation pulse signal at the target control rotating speed. As a result, the frequency comparator S must generate a reference signal $$f_O\left(1 - \frac{0.5}{100}\right)$$

and a reference signal $$f_O\left(1 + \frac{0.5}{100}\right)$$

from a frequency of a crystal oscillator divided by a counter, in order to compare them with $f_{MO}$. Therefore, a complex and expensive circuit is required and a compact and inexpensive motor control device is hardly attained. The pull-in range $W_P$ is experimentally determined and the experimentally determined pull-in range does not always cover all worst conditions. Accordingly, the phase synchronization pull-in may not be attained in certain cases. If the frequency is compared in a much narrower range than the pull-in range in order to avoid the above problem, the frequency comparator S will be further complex and expensive. When the control loop is opened or closed, a disturbance by the switching of the relay T occurs and a smooth switching of the control loop is not attained

SUMMARY OF THE INVENTION

It is an object of the present invention to provide a compact and inexpensive motor control device.

It is another object of the present invention to provide a motor control device which facilitates the phase synchronization pull-in and provides a stable rotation.

It is another object of the present invention to provide a motor control device having excellent phase synchronization pull-in characteristic and phase variation compensation characteristic.

It is another object of the present invention to provide a motor control device which is suitable for use in a scanner of a laser beam printer. It is another object of the present invention to provide a motor control device which can smoothly switch a control loop.

The another objects of the present invention will be apparent from the following description of the invention taken in conjunction with the accompanying drawings.

BRIEF DESCRIPTION OF THE DRAWINGS

FIGS. 5(a)–5(d) show output waveforms in the circuit of FIG. 1.

FIG. 5(e) shows an output waveform of an operational amplifier E in the circuit of FIG. 3, and FIGS. 6, 7 and 8 shown schematic views of a laser beam printer to which the present invention is applied.

DETAILED DESCRIPTION OF THE PREFERRED EMBODIMENTS

Figure 1:
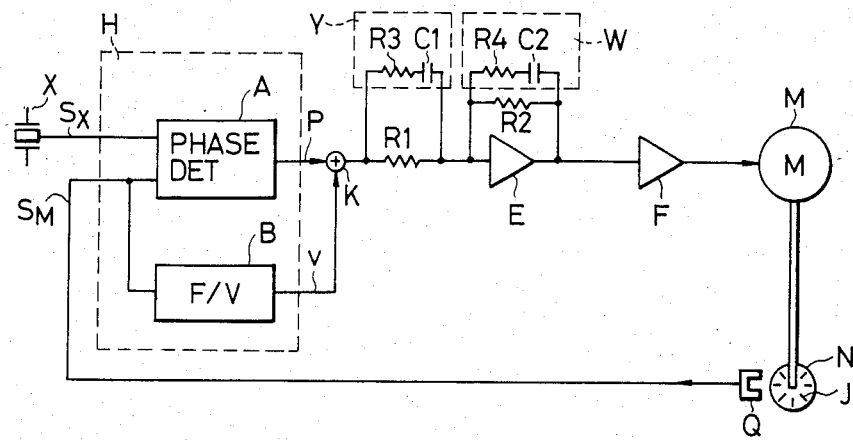
FIGS. 1 and 2 show prior art motor control circuits using PLL.
Figure 2:
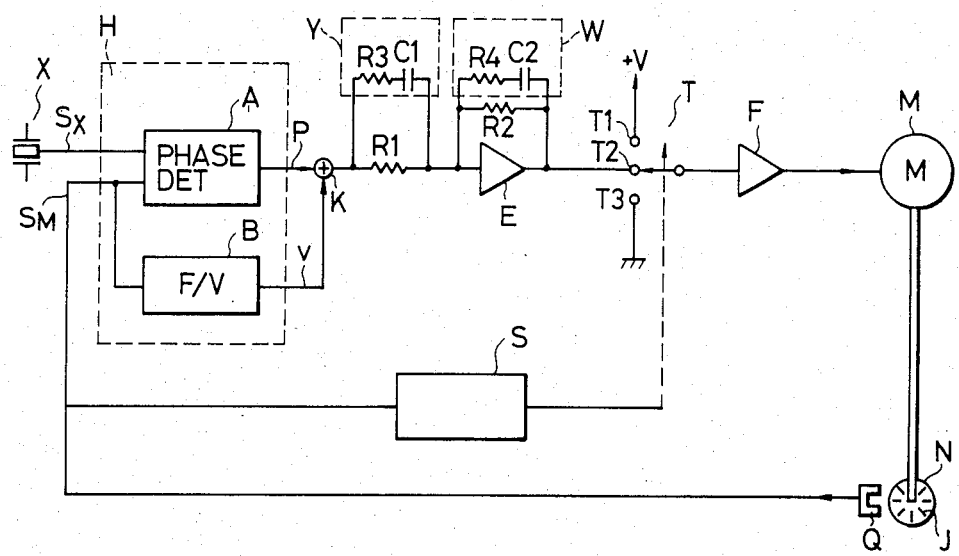

FIG. 3 shows a motor control circuit using the PLL in accordance with an embodiment of the present invention. The like elements to those shown in FIG. 1 are designated by the like numerals and the explanation thereof is omitted. R5 and R6 denote resistors, C3 denotes a capacitor and D1 and D2 denote diodes. The resistor R6 has a sufficiently larger resistance than the resistors R5, R4 and R2. The resistor R5 has a sufficiently smaller resistance than the resistors R2 and R4. In the circuit of FIG. 3, in order to enhance the stability of the control in the steady rotation, the phase retardation compensation and the phase advance compensation are effected by the phase advance compensation circuit Y having a time constant $\tau_1 = R3 \cdot C1$ and the phase retardation compensation circuit W having $\tau_2 = R4.C2$, and the constants are selected as optimum value to the phase variation compensation response in the steady rotation. If the additional circuit Z is not provided, the phase variation compensation ability in the steady rotation is enhanced but the phase synchronization pull-in characteristic is deteriorated and a longer time is required for the frequency pull-in period and the phase synchronization period (that is, the phase synchronization pull-in period), and the synchronization pull-in may not be attained in certain cases.

The operation with the additional circuit Z being provided is now explained. The additional circuit Z is inserted in parallel to the phase retardation compensation circuit W, for the operational amplifier E. Accordingly, the additional circuit Z is essentially a kind of the phase retardation compensation circuit.

Figure 3A:
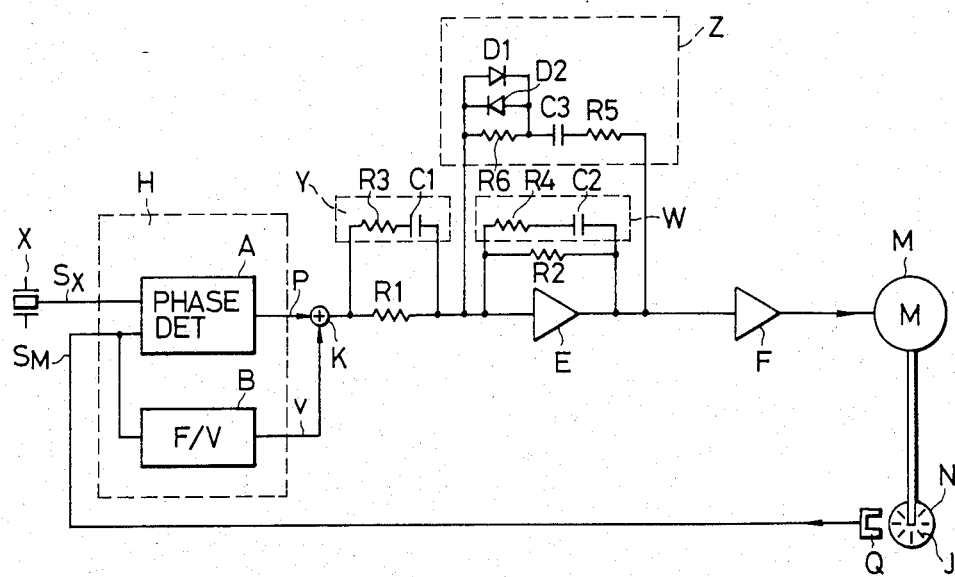
FIG. 3(a) shows a motor control circuit using the PLL in accordance with one embodiment of the present invention.
Figure 3B:
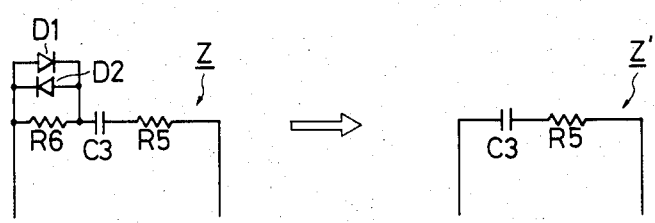
FIG. 3(b) shows an equivalent circuit of an additional circuit Z in the phase synchronization period.
Figure 4:
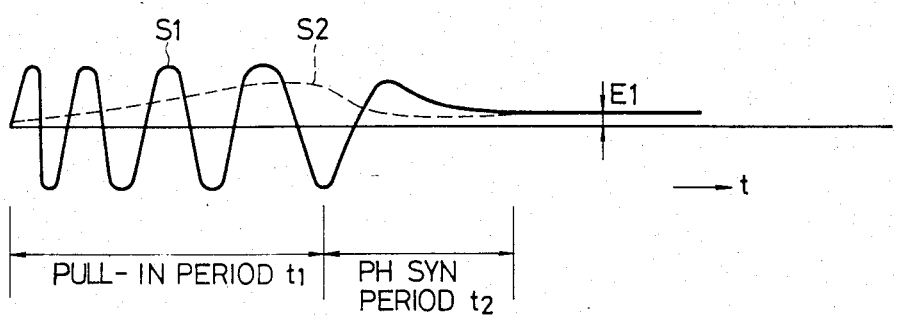
FIG. 4 illustrates the synchronization period of the PLL control circuit.

FIG. 5(e) shows an output waveform of the operational amplifier E of the circuit of FIG. 3. In a period t3 in which the output of the adder K cycle-slips during the frequency pull-in period and the phase synchronization period to change in a flicker fashion, the diode D2 of the additional circuit Z of FIG. 3(a) conducts in a positive half-cycle of the output of the operational amplifier E and the diode D1 conducts in a negative half-cycle. Accordingly, the additional circuit Z can be represented by an equivalent circuit Z' shown in FIG. 3(b). Since the resistance of the resistor R5 is sufficiently smaller than those of the resistors R2 and R4, a gain of an AC component (phase error component) in the operational amplifier E is extremely lowered. The output of the operational amplifier E in the prior art circuit is at a level shown in FIG. 5(d) [also shown by a broken line in FIG. 5(e)]. In the present circuit, only the AC component (phase error component) is extremely lowered without lowering the gain for the DC component (frequency component). As a result, no beat signal variation occurs and the phase synchronization pull-in is readily attained.

When the phase synchronization pull-in is completed and the steady rotation is reached [the range shown by t4 in FIG. 5(e)], the output of the adder K does not include a large AC component but includes only a small AC component for the phase correction and it is essentially a DC component. A half-wave peak of the small AC component included varies in a range smaller than a forward voltage (approximately 0.7 volt for a silicon diode) of the diodes D1 and D2. As a result, the diodes D1 and D2 do not conduct and the circuit is equivalent to a circuit without the additional circuit Z because the resistance of the resistor R6 is sufficiently larger than those of the resistors R2 and R4. Thus, the PLL control circuit of FIG. 3 in the steady rotation is equivalent to the PLL control circuit of FIG. 1. Accordingly, after the steady rotation has been attained, the PLL having the enhanced phase variation compensation ability is achieved.

By the provision of the additional circuit Z, the phase error component can be eliminated after the start of the motor and before the completion of the phase synchronization pull-in, and the circuit is operated by the frequency component and the phase synchronization pull-in is facilitated. In the steady rotation after the phase synchronization pull-in, the circuit operates as if it had no additional circuit Z. Accordingly, the optimum design in the steady rotation can be applied to the PLL control circuit. On the other hand, the phase synchronization pull-in characteristic can be improved independently from the characteristic in the steady rotation without sacrificing the optimum design. Accordingly, the design of the circuit is facilitated.

As described above, the PLL control circuit with the improved phase synchronization pull-in characteristic is obtained with the simple and inexpensive additional circuit without lowering the phase variation compensation ability.

The present invention is not limited to the circuit configuration shown in FIG. 3 but can be applied to any circuit which eliminates the phase error component until the phase synchronization pull-in is completed and which is equivalent to the circuit of FIG. 1 having the enhanced phase variation compensation ability in the steady rotation.

As described hereinabove, the present invention provides the compact and inexpensive motor control device.

The present invention also provides the motor control device which facilitates the phase synchronization pull-in and attains the stable rotation of the motor.

Figure 6:
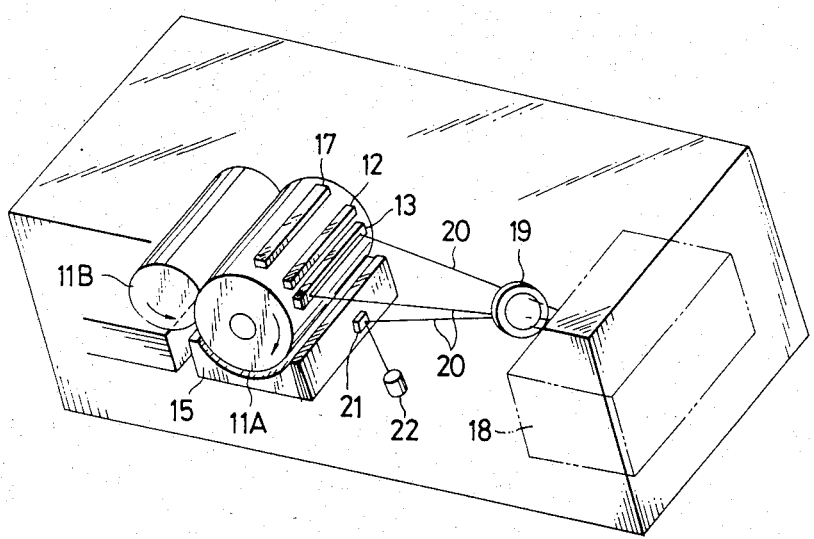
Figure 7:
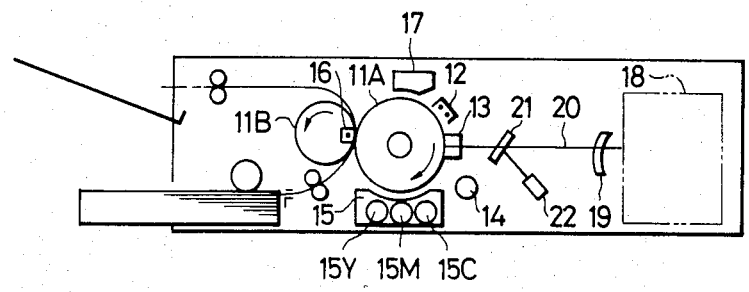
Figure 8:
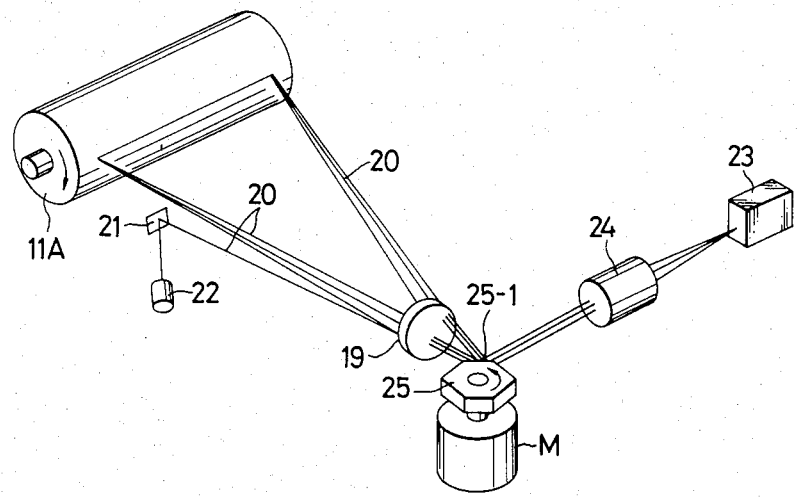

FIGS. 6, 7 and 8 shows a laser beam printer to which the present invention is applied.

Numeral 11A designates a photosensitive drum, and numeral 11B designates an image transfer drum. These drums 11A and 11B rotate in the directions of arrows, respectively. Along the rotational direction of the photosensitive drum 11A, there are sequentially arranged around the drum a primary charger 12, an exposure and charging device 13, a flat exposure device 14, a developing device 15, an image transfer charger 16, and a cleaning section 17. Numeral 18 denotes a light beam scanning section upto a condenser lens 19 in an optical system shown in FIG. 8.

In FIG. 8, a detail of the optical system of the present embodiment is shown, in which light beam emitted from a semiconductor laser 23 is collimated by a collimator lens 24, and impinged on a rotatory polygonal mirror 25 rotated by a motor M at a high speed. The light beam impinged on the rotatory polygonal mirror 25 is reflected by one of the reflecting mirror surfaces 25-1 of the polygonal mirror 25, after which it passes through the condenser lens 19 as focusing means and focused on the photosensitive drum 11A. Thus, a main scan is performed in accordance with an angle of reflection of the reflecting mirror surface 25-1 as the rotatory polygonal mirror 25 rotates. A subscan is effected by the rotation of the photosensitive drum 11A. An input signal $S_{in}$ is fed in the semiconductor laser 23, and an image is formed on the surface of the photosensitive drum 11A by the laser beam intensity-modulated by the input signal. In order to generate a horizontal synchronous signal for aligning the start position of each main scan, a part of the laser beam is led to a light detector 22 through a mirror 21 when the partial light beam passes by a position slightly outward of the main scan start position of the beam. The horizontal synchronous signal is generated when the light beam enters into this light detector 22. A predetermined time after the horizontal synchronous signal was generated, the abovementioned input signal $S_{in}$ is supplied to the semiconductor laser 23.

In FIGS. 6 and 7, DC corona discharge is applied to the surface of the rotating photosensitive drum 11A by the primary charger 12 to uniformly charge the photosensitive member on the drum surface either in the positive or negative polarity. At the exposure and charging section 13, DC corona discharge of the opposite polarity to that of the primary charge or AC corona discharge is imparted to the photosensitive member, and, simultaneously, the light beam main-scanned by the rotatory polygonal mirror 25 is exposed on the photosensitive drum 11A to form an electrostatic latent image on the photosensitive drum 11A. Subsequently, the electrostatic latent image on the photosensitive member is uniformly irradiated with light by means of the flat illumination device 14 such as a fluorescent lamp to increase a difference in the surface potentials between a portion exposed to the recording light beam and a portion not exposed to it. Thus, an electrostatic latent image with a high image contrast is formed on the surface of the photosensitive drum 11A.

The abovementioned electrostatic latent image of high image contrast is visualized by the developing device 15. Such development can be done by the magnet brush method or the fur brush method. Then, a powder image of the image as developed is electrostatically transferred onto a sheet material such as paper held on the peripheral surface of the image transfer drum 11B. The developing device 15 consists of three developing units, as in FIG. 3, i.e., a yellow (Y) unit 15Y, a magenta (M) unit 15M, and a cyan (C) unit 15C. By repeating the development for three times through these units, i.e., by three revolutions of the photosensitive drum 11A, a color original image is transferred onto a sheet of paper held on the image transfer drum 11B. After the image transfer, the photosensitive drum 11A is subjected to cleaning to remove the residual toner on its surface by means of a roller in the cleaning section The present invention is not limited to the illustrated embodiments but many modifications and charges may be made within a scope of the appended claims.

What is claimed is:

1. A motor control device comprising speed detection means for detecting a motor speed and for generating a detection signal having a frequency depending on the motor speed; reference signal generating means for generating a reference signal having a reference frequency; and control means for controlling the motor speed; wherein said control means includes:
   means for detecting a phase difference between the reference signal and the detection signal and for generating a phase difference signal depending on the phase difference;
   means for generating a speed signal depending on the frequency of the detection signal;
   combining means for combining the phase difference signal and the speed signal and for generating a control signal for controlling the motor speed; and
   error-eliminating means for substantially eliminating from the control signal, generated by said combining means, a phase error component resulting from the phase difference between the reference signal and the detection signal when the phase error component exceeds a predetermined level during the phase synchronization pull-in period, and for providing the control signal from which the error component has been eliminated to said motor.

2. A motor control device according to claim 1 wherein said combining means includes adder means for adding the phase difference signal to the speed signal at a predetermined summation ratio.

3. A motor control device according to claim 1 further comprising conductor means for conducting the control signal to said motor and wherein said error-eliminating means includes a pair of resistors and a capacitor connected in series with each other and together connected in parallel with said conductor means, and first and second diodes each connected in parallel with one of said resistors for conducting in opposite directions.

4. A motor control device according to claim 1 further comprising a phase advance compensation circuit.

5. A motor control device according to claim 1 further comprising a phase retardation compensation circuit.

6. A motor control device comprising speed detection means for detecting a motor speed and for generating a detection signal having a frequency depending on the motor speed; reference signal generating means for generating a reference signal having a reference frequency; and control means for controlling the motor speed; wherein said control means includes:
   means for detecting a phase difference between the reference signal and the detection signal and for generating a phase difference signal depending on the phase difference;
   means for generating a speed signal depending on the frequency of the detection signal;
   combining means for combining the phase difference signal and the speed signal and for generating a control signal for controlling the motor speed; and
   eliminating means for substantially eliminating from the control signal, generated by said combining means, an AC component resulting from the phase difference between the reference signal and the detection signal when the AC component exceeds a predetermined level during the phase synchronization pull-in period, and for providing the control signal from which the AC component has been eliminated to said motor.

7. A motor control device according to claim 6, wherein said combining means includes adder means for adding the phase difference signal to the speed signal at a predetermined summation ratio.

* * * * *